US009411667B2

(12) United States Patent
Jayakumar et al.

(10) Patent No.: US 9,411,667 B2
(45) Date of Patent: Aug. 9, 2016

(54) RECOVERY AFTER INPUT/OUPUT ERROR-CONTAINMENT EVENTS

(75) Inventors: Sarathy Jayakumar, Portland, OR (US); Mohan J. Kumar, Aloha, OR (US); Jose A. Vargas, Rescue, CA (US)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 13/997,870

(22) PCT Filed: Jun. 6, 2012

(86) PCT No.: PCT/US2012/041160
§ 371 (c)(1),
(2), (4) Date: Jun. 25, 2013

(87) PCT Pub. No.: WO2014/209251
PCT Pub. Date: Dec. 31, 2014

(65) Prior Publication Data
US 2013/0332781 A1 Dec. 12, 2013

(51) Int. Cl.
*G06F 11/00* (2006.01)
*G06F 11/07* (2006.01)

(52) U.S. Cl.
CPC ........ *G06F 11/0751* (2013.01); *G06F 11/0712* (2013.01); *G06F 11/0745* (2013.01); *G06F 11/0793* (2013.01)

(58) Field of Classification Search
CPC ............ G06F 11/0751; G06F 11/0793; G06F 11/0745; G06F 11/0712; G06F 11/0772; G06F 11/2221; G06F 13/00; G06F 13/385; G06F 2003/0697; G06F 11/00; G06F 13/126; G06F 11/3485; G06F 13/24; G06F 2003/0692; G06F 21/53; G06F 12/0261; G06F 12/16; G06F 9/26; G06F 9/4825; G06F 11/1004; G06F 11/2236; H04L 63/166; H04L 29/06; H04L 69/16

See application file for complete search history.

(56) References Cited

U.S. PATENT DOCUMENTS 5,193,181 A    3/1993   Barlow et al.
8,510,592 B1 *   8/2013   Chan .............................. 714/5.1
(Continued)

FOREIGN PATENT DOCUMENTS

| CN | 1849586 A | 10/2006 |
|---|---|---|
| CN | 101126995 A | 2/2008 |
| JP | 2008262538 A | 10/2008 |
| TW | 201216165 A | 4/2012 |

OTHER PUBLICATIONS

Search Report and Written Opinion mailed Feb. 16, 2015 for Taiwan Application No. 102118229, 2 pages.
(Continued)

*Primary Examiner* — Jason Bryan
(74) *Attorney, Agent, or Firm* — Schwabe, Williamson & Wyatt, P.C.

(57) ABSTRACT

Embodiments of apparatus, computer-implemented methods, systems, devices, and computer-readable media are described herein for a computing device with a platform entity such as an interrupt handler configured to notify an operating system or virtual machine monitor executing on the computing device of an input/output error-containment event. In various embodiments, the interrupt handler may be configured to facilitate recovery of a link to an input/output device that caused the input/output error-containment event, responsive to a directive from the operating system or virtual machine monitor.

27 Claims, 5 Drawing Sheets

(56) References Cited

U.S. PATENT DOCUMENTS

| | | | |
|---|---|---|---|
| 2003/0041232 A1* | 2/2003 | McDaniel | 712/244 |
| 2003/0126516 A1 | 7/2003 | Komarla et al. | |
| 2005/0102567 A1 | 5/2005 | McGuire et al. | |
| 2006/0085665 A1 | 4/2006 | Knight et al. | |
| 2006/0107125 A1 | 5/2006 | Hsu et al. | |
| 2007/0061634 A1 | 3/2007 | Marisetty et al. | |
| 2008/0126852 A1 | 5/2008 | Brandyberry et al. | |
| 2008/0184077 A1 | 7/2008 | Kuttan et al. | |
| 2011/0283037 A1* | 11/2011 | Koga et al. | 710/313 |
| 2012/0079312 A1 | 3/2012 | Muthrasanallur et al. | |
| 2013/0159764 A1* | 6/2013 | Adar et al. | 714/5.1 |

OTHER PUBLICATIONS

International Search Report and Written Opinion mailed Dec. 30, 2014 for International Application No. PCT/US2012/041160, 11 pages.

Office Action mailed Jun. 19, 2015 for Australian Application No. 2012398458, 2 pages.

Extended European Search Report mailed Feb. 15, 2016 for European Patent Application No. 12891435.5, 9 pages.

Office Action mailed Mar. 29, 2016 for Japanese Patent Application No. 2015-524229, 5 pages.

* cited by examiner

RECOVERY AFTER INPUT/OUPUT ERROR-CONTAINMENT EVENTS

CROSS REFERENCE TO RELATED APPLICATIONS

The present application is a national phase entry under 35 U.S.C. §371 of International Application No. PCT/US2012/041160, filed Jun. 6, 2012, entitled "RECOVERY AFTER INPUT/OUPUT ERROR-CONTAINMENT EVENTS", which designated, among the various States, the United States of America. The Specification of the PCT/US2012/041160 Application is hereby incorporated by reference.

FIELD

Embodiments of the present invention relate generally to the technical field of data processing, and more particularly, to recovery after input/output error-containment events.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Error-containment logic, such as hardware or firmware configured with Live Error Recovery ("LER") technology developed by Intel® Corporation of Santa Clara, Calif., may be used to contain errors that occur on input/output ("I/O") devices operably coupled using various technologies, such as Peripheral Component Interconnect Express ("PCIe"), LER enables recovery of an I/O device/port after an error on the port is contained. However, there still may be system failure, e.g., at an operating system ("OS") or a virtual machine monitor ("VMM") level, because there may be insufficient or no coordination between the error-containment logic and the OS/VMM.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
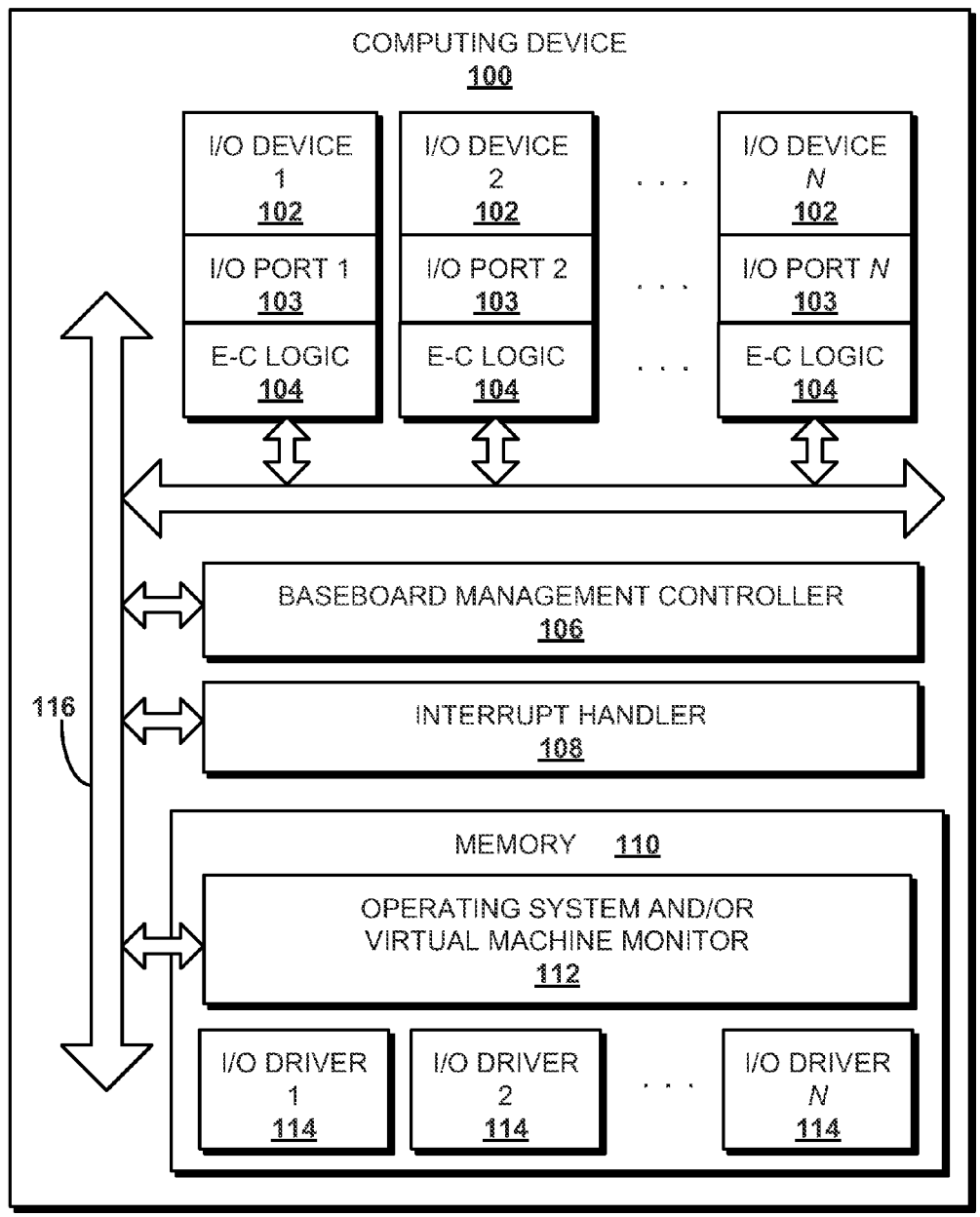
FIG. 1 schematically illustrates an example computing device configured with applicable portions or the teachings of the present disclosure, in accordance with various embodiments.

FIG. 1 schematically depicts various components that may be implemented on a computing device 100 configured with applicable portions of the teachings of the present disclosure. A plurality of input/output ("I/O") devices 102, labeled 1-N in FIG. 1, may be connected to a plurality of I/O ports 103. The plurality of I/O devices 102 may include various types of I/O devices, including but not limited to keyboards, mice, touch-sensitive screens, displays, speakers, printers, faxes, storage devices (e.g., hard disk drives, solid state drives), scanners, wired and wireless communication interfaces such as antenna, and so forth. In various embodiments, I/O ports 103 may be various types of ports, such as Peripheral Component Interconnect Express ("PCIe") root ports.

Each I/O port 103 may include error-containment logic 104 (denoted "E-C LOGIC" in FIG. 1). Error-containment logic 104 may be hardware, software (e.g., instructions in firmware), or any combination of the two, that is configured to detect and contain errors on I/O ports 103 and/or I/O devices 102, to prevent error propagation. In various embodiments, error-containment logic 104 may include Live Error Recovery ("LER") technology developed by Intel® Corporation of Santa Clara, Calif. In various embodiments, when an error is detected, an error-containment status bit (e.g., an LER event status bit) for the I/O port 103 experiencing the error may be set to indicate that an error-containment mode has been triggered. In various embodiments, upon an error-containment event, the I/O port 103 may force a link to the I/O device 102 to a LinkDown state, in which outbound requests may be aborted. In various embodiments, inbound packets relay be permitted to drain normally in the LinkDown state. In various embodiments, upon clearing of the error-containment event, the error-containment status bit of the I/O port 103 may be cleared. The link may be permitted to enter a LinkUp state, in which transactions are permitted to propagate normally.

Computing device 100 may include various "platform entities" that control various low level functions. Platform entities may be implemented with hardware software (e.g., microcontroller firmware) or any combination of the two. For some embodiments, they may include but are not limited to a baseboard management controller ("BMC") 106 and/or an interrupt handler 108. In various embodiments, BMC 106 or its equivalent may be a specialized service processor that monitors the physical state of computing device 100 using sensors and other similar technology.

Interrupt handler 108 may be configured to execute in response to hardware and/or software interrupts. Interrupt handler 108 may perform various routines depending on the nature of interrupt that triggers its execution. For example, if a user (not shown) presses a key on a keyboard (not shown) or interacts with a touch-sensitive screen (not shown), a hardware interrupt may be sent from a corresponding keyboard or touch-sensitive screen controller to interrupt handler 108, which may in turn provide an indication of entry of the input to one or more other components (e.g., a word processing application).

Computing device 100 may also include memory 110. Memory 110 may be various types of memory, such as dynamic random access memory ("DRAM"). In various embodiments, memory 110 may include instructions for executing an operating system ("OS") and/or virtual machine monitor ("VMM") 112. Memory 110 may further include instructions for executing a plurality of drivers 114, labeled 1-N in FIG. 1, that may provide software interfaces to the plurality of I/O devices 102. Although not shown in FIG. 1, memory 110 may also include instructions for executing any number of other computer programs (e.g., applications such as word processors, media players, web services, etc.).

As noted in the background, error-containment logic 104 and higher level components of computing device 100 (e.g., OS/VMM 112) may not coordinate when an I/O error causes an error-containment event to be signaled by error-containment logic 104. This may result in computing device 100 failing even though the I/O error has been contained. Accordingly, various techniques described herein may be implemented to prevent failure of computing device 100 at the OS/VMM level after occurrence of an I/O error-containment event. This may increase reliability, availability and serviceability ("RAS") in mission-critical environments.

In various embodiments, error-containment logic 104 may notify a platform entity such as interrupt handler 108 of an I/O error-containment event. The platform entity may in turn notify OS/VMM 112 of the I/O error-containment event. For example, in various embodiments, interrupt handler 108 may notify OS/VMM 112 of the I/O error-containment event using a communication channel between platform entities and OS/VMM 112, such as platform communication channel ("PCC") 116. PCC 116 may be a mechanism usable by platform entities such as a BMC 106, error-containment logic 104 and/or interrupt handler 108 to communicate with higher-level entities of computing device 100, such as OS/VMM 112. In various embodiments, PCC 116 may define an address space that may be implemented as one or more independent communications channels, or subspaces. In various embodiments, PCC 116 may comply with the Advanced Configuration and Power interface Specification, Revision 5.0, published Dec. 6, 2011 ("ACPI Specification"). In various embodiments, the platform entity such as interrupt handler 108 may notify the OS/VMM 112 directly of the error-containment event, e.g., over PCC 116, without going through interrupt handler 108.

In various embodiments, various components may facilitate recovery of a link to an I/O device 102 that caused the I/O error-containment event. For instance, OS/VMM 112 may clear a software stack associated with the I/O port 103 and/or I/O device 102 and communicate an indication that the stack has been cleared (e.g., using PCC) to a platform entity such as interrupt handler 108. Interrupt handler 108 may in turn alter the contents of various hardware registers to recover the link. For example, interrupt handler 108 may clear—or cause error-containment logic 104 or other logic associated with I/O port 103 to clear—error registers, and may clear an Error-containment event status bit of I/O port 103 that was set in response to an I/O error-containment event. In various embodiments, once these registers are cleared, the I/O port may transition the link to I/O device 102 to a Linkup state.

Figure 2:
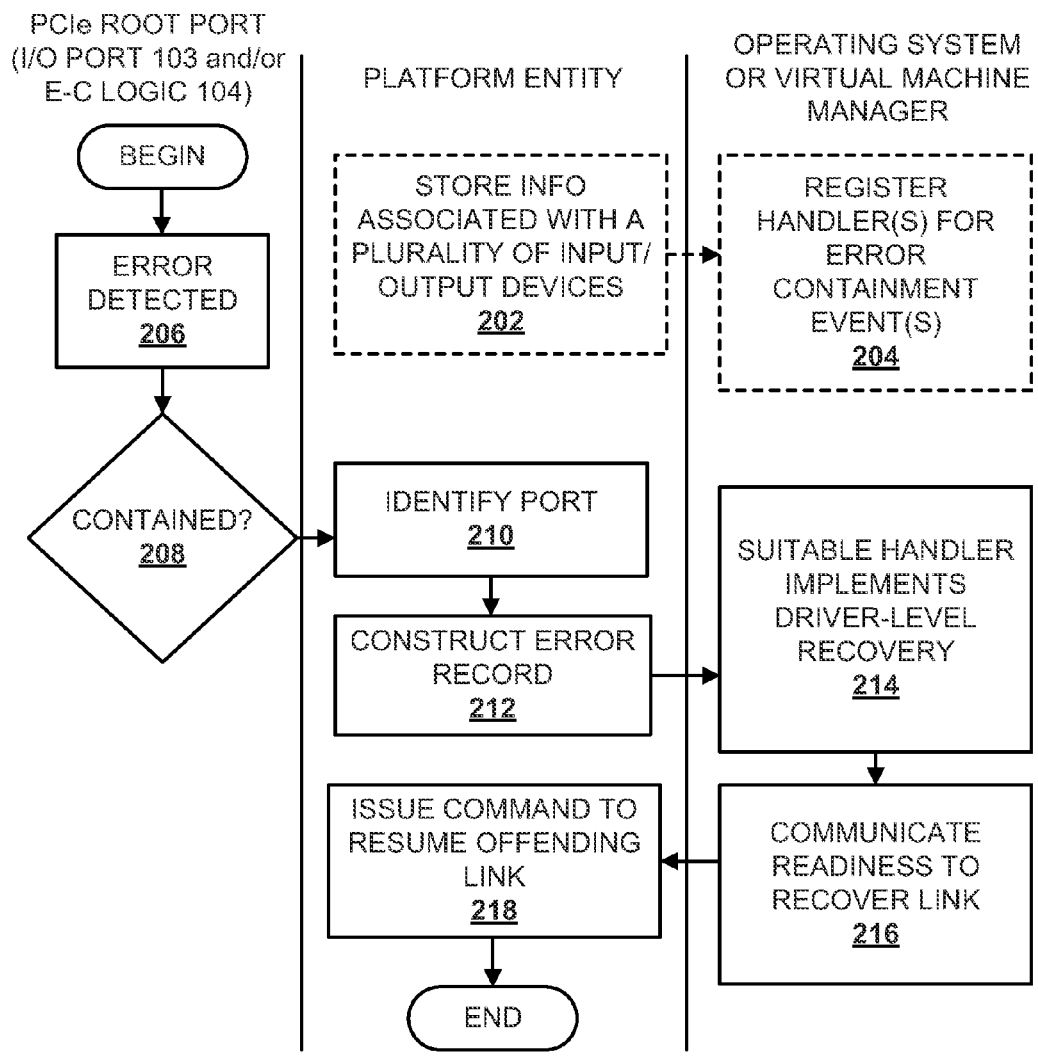
FIG. 2 schematically depicts an example process flow between various components, in accordance with various embodiments.

An example process flow between various components of computing device 100 is shown in FIG. 2. On the left-hand side is a PCIe root port, which may correspond to an error-containment logic 104 and/or an I/O port 103 of FIG. 1. In the middle is a platform entity, which in various embodiments may be one or more of interrupt handler 108 and/or BMC 106. On the right-hand side is an OS or VMM, e.g., OS/VMM 112 of FIG. 1.

At various points in time, such as when computing device 100 is booting up, various components may perform initializing routines (shown in dashed lines) to prepare computing device 100 to recover links to I/O devices 102 and/or I/O ports 103 while avoiding OS/VMM-level failure. For instance, at block 202, information associated with a plurality of I/O ports 103 may be stored, e.g., by a platform entity such as interrupt handler 108, in memory accessible to OS/VMM 112. In some embodiments, this information may be stored in a format that comports with the ACPI Specification. In various embodiments, this information may include I/O port information (e.g., type of device connected thereto, etc.) types of errors that may be handled, and so forth. At block 204, this information may be used by the OS/VMM 112 to register a plurality of error-containment event handlers. In various embodiments, the plurality of event handlers may correspond to the plurality of I/O ports 103.

Upon occurrence of an I/O error, at block 206, the I/O error may be detected, e.g., by error-containment logic 104 at a particular I/O port 103. At block 208, a determination may be made, e.g., by error-containment logic 104, whether the detected error has been contained. For example, in various embodiments, LER hardware/software may signal that the I/O error has been contained. If the error is contained, error-containment logic 104 may signal an I/O error-containment event, and the process may proceed to block 210.

At block 210, a platform entity such as interrupt handler 108 may identify the I/O port 103 that experienced the I/O error. For instance, error-containment logic 104 may notify interrupt handler 108 of the error-containment event and the I/O port 103 on which it occurred. At block 212, an error-containment record may be generated, e.g., by a platform entity such as interrupt handler 108. The error-containment record may include various information, including but not limited to the identified I/O port 103 that experienced the error, information about the error, and so forth. The error-containment record may then be communicated to OS/VMM 112. In various embodiments, interrupt handler 108 may utilize a PCC doorbell protocol, which may include using a hardware register that is accessible via I/O or memory-mapped I/O, to communicate the error-containment record to OS/VMM 112. At block 214, a suitable error-containment event handler (which may have been generated at block 204) may implement driver-level recovery. For instance, the error-containment event handler may notify driver 114, (corresponding to the I/O port 103 and/or device 102 that caused the error-containment event) of the error-containment event, so that driver 114 may indicate whether it is able to recover the I/O device 102 that experienced the error.

Assuming the driver indicates that it will be able to recover the I/O device 102, at block 216, OS/VMM 112 may communicate, e.g., to a platform entity such as interrupt handler 108 via PCC 116, a readiness and/or directive to recover a link to the I/O device 102 that caused the error-containment event. In various embodiments, OS/VMM 112 may utilize the PCC doorbell protocol to communicate this readiness/directive to the platform entity. At block 218, suitable commands (e.g., clear error register(s)) may be issued, e.g., by a platform entity such as interrupt handler 108, to cause I/O port 103 to resume the link.

Figure 3:
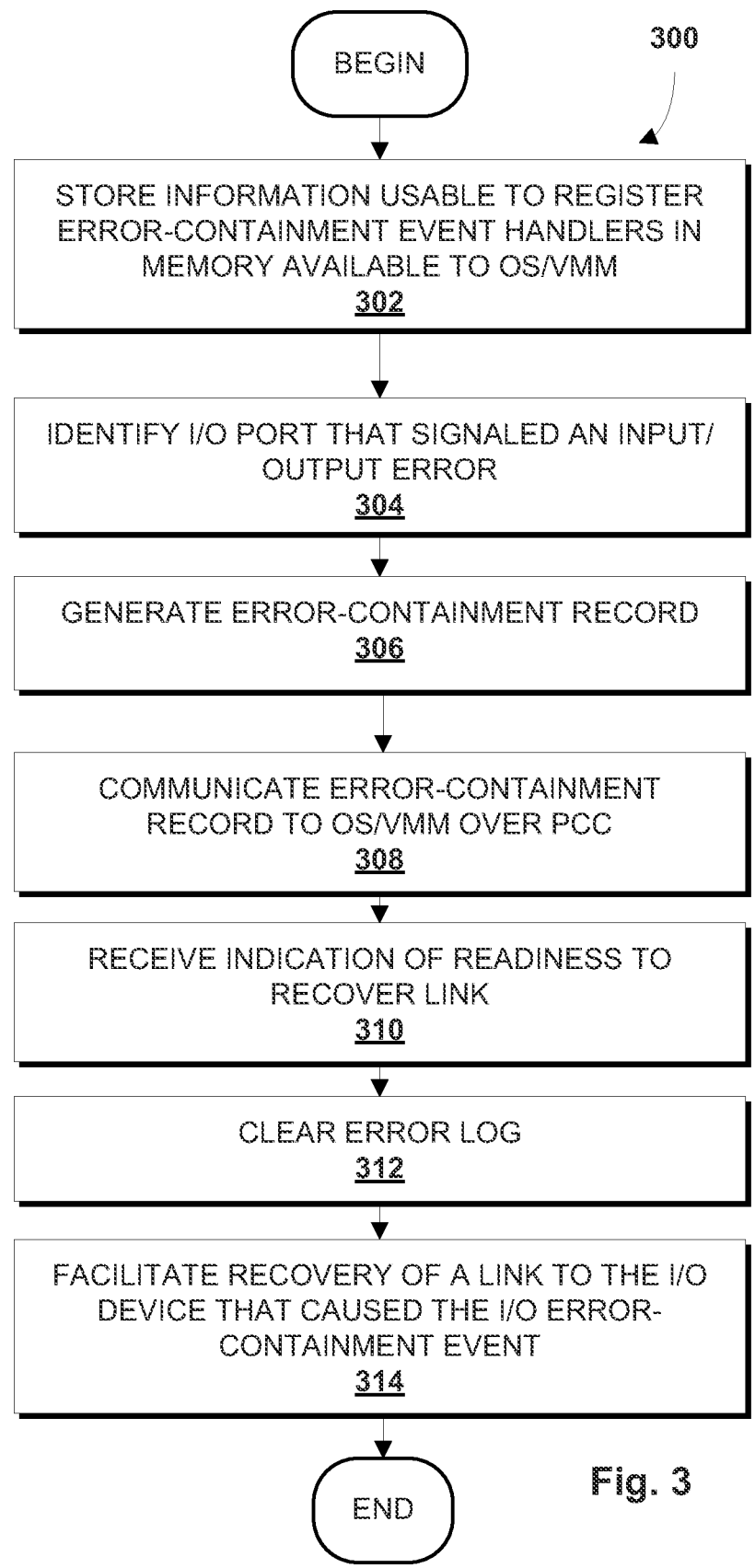
FIG. 3 schematically depicts an example method that may be implemented by a platform entity such as an interrupt handler, in accordance with various embodiments.

An example method 300 that may be implemented by a platform entity such as interrupt handler 108 is depicted in FIG. 3. At block 302, information associated with a plurality of I/O ports 103 and/or I/O devices 102, which may be usable by OS/VMM 112 to register a plurality of error-containment event handlers that correspond to the plurality of I/O ports 103, may be stored (or "published"), e.g., by interrupt handler 108, in memory accessible to the OS/VMM 112.

Upon occurrence of an I/O error, at block 304, an I/O port 103 with error containment logic 104 that signaled a corresponding I/O error-containment event may be identified, e.g., by a platform entity such as interrupt handler 108. While not shown in FIG. 3, in various embodiments, the platform entity may wait until all active (or "in-flight") transactions on the I/O port 103 experiencing the error are completed (or "drained") before proceeding further.

After all in-flight transactions are completed, at block 306, a platform entity such as interrupt handler 108 may generate an error-containment record associated with the error-containment event. In various embodiments, the error-containment record may include various information, such as an identification of the I/O port 103 for which the error-containment event was triggered. At block 308, the error-containment record may be communicated, e.g., by a platform entity such as interrupt handler 108, to OS/VMM 112. As noted above, this communication may occur over PCC 116, e.g., using the PCC doorbell protocol.

At block 310, a platform entity such as interrupt handler 108 may receive, e.g., from OS/VMM 112 over PCC 116, an indication that OSS/VMM 112 is ready to recover the link to the failed I/O device 102. In various embodiments, at block 312, a platform entity such as interrupt handler 108 may then clear an error log associated with the I/O port 103 that experienced the I/O error-containment event. In various embodiments, at block 314, a platform entity such as interrupt handler 108 may facilitate recovery of the I/O port 103 that experienced the I/O error-containment event. For instance, interrupt handler 108 may issue suitable commands to cause I/O port 103 to resume the link.

Figure 4:
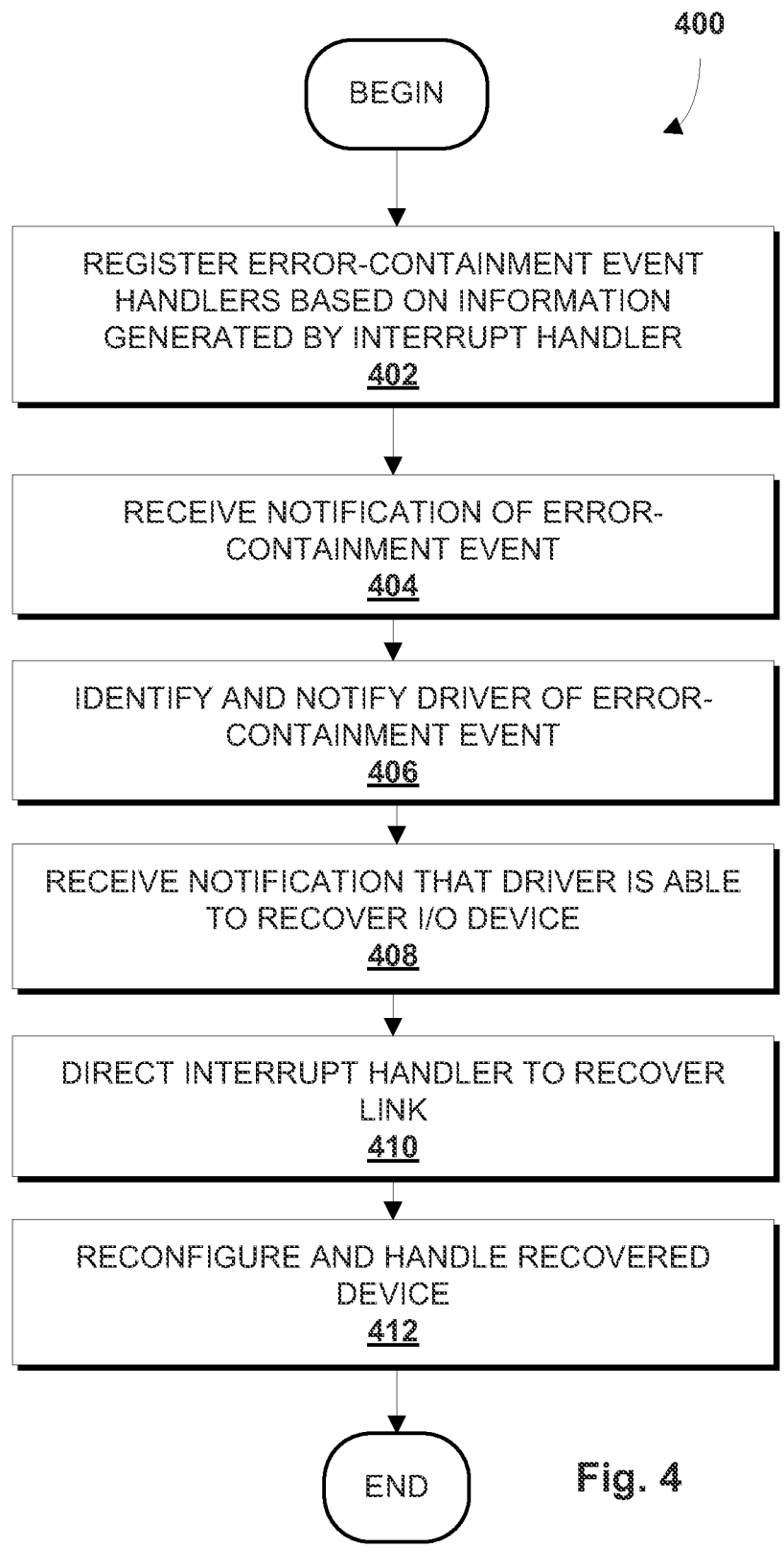
FIG. 4 schematically depicts an example method that may be implemented by an operating system or virtual machine monitor, in accordance with various embodiments.

FIG. 4 depicts an example method 400 that may be implemented by various components, such as OS/VMM 112, in accordance with various embodiments. At block 402, a plurality of error-containment event handlers associated with a plurality of I/O ports 103 may be registered, e.g., by OS/VMM 112, based on information associated with the plurality of I/O ports 103 stored by, e.g., interrupt handler 108, at 302 of FIG. 3. The error-containment event handlers may be generated at various points in time, such as at startup.

At block 404, notification of an error-containment event may be received, e.g., by OS/VMM 112, from a platform entity such as interrupt handler 108. In various embodiments, this notification may be received over PCC 116, e.g., using the PCC doorbell protocol. At block 406, a driver 114 associated with the I/O device 102 that caused the error-containment event may be identified and notified, e.g., by OS/VMM 112, of the error-containment event. At block 408, OS/VMM 112 may receive, e.g., from the driver 114 associated with the I/O device 102, a notification that the driver is able to recover the I/O device 102.

Once OS/VMM 112 is notified that the driver 114 will be able to recover the I/O device 102, at block 410, OS/VMM 112 may direct a platform entity such as interrupt handler 108, e.g., over PCC 116, to recover the link to the I/O device 102 that experienced the error. When the link to the failed I/O device 102 that experienced the error-containment event is recovered, at block 412, OS/VMM may reconfigure and handle the I/O device 102 as it did prior to the error.

Figure 5:
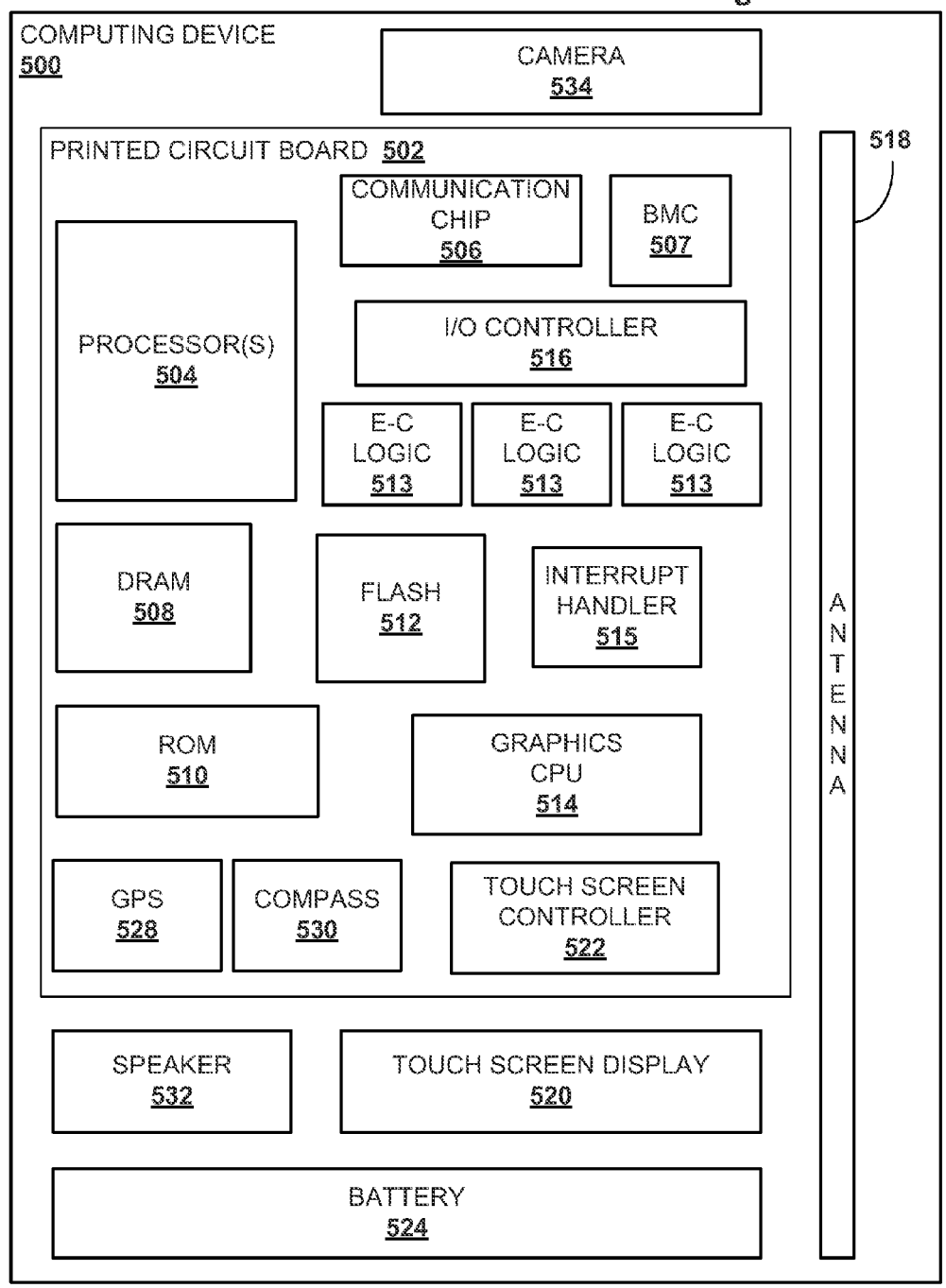
FIG. 5 schematically depicts an example computing device on which disclosed methods and computer-readable media may be implemented, in accordance with various embodiments.

FIG. 5 illustrates an example computing device 500, in accordance with various embodiments. Computing device 500 may include a number of components, a processor 504 and at least one communication chip 506. In various embodiments, the processor 504 may be a processor core. In various embodiments, the at least one communication chip 506 may also be physically and electrically coupled to the processor 504. In further implementations, the communication chip 506 may be part of the processor 504. In various embodiments, computing device 500 may include printed circuit board ("PCB") 502. For these embodiments, processor 504 and communication chip 506 may be disposed thereon. In alternate embodiments, the various components may be coupled without the employment of PCB 502.

Depending on its applications, computing device 500 may include other components, such as one or more of the platform entities discussed herein, that may or may not be physically and electrically coupled to the PCB 502. These other components include, but are not limited to, a BMC 507 (configured with applicable portions of the teachings of the present disclosure), volatile memory (e.g., dynamic random access memory 508, also referred to as "DRAM"), non-volatile memory (e.g., read only memory 510, also referred to as "ROM"), flash memory 512, one or more error-containment logics 513 (configured with applicable portions of the teachings of the present disclosure), a graphics processor 514, an interrupt handler 515 (configured with applicable portions of the teachings of the present disclosure), a digital signal processor (not shown), a crypto processor (not shown), an input/output ("I/O") controller 516, an antenna 518, a display (not shown), a touch screen display 520, a touch screen controller 522, a battery 524, an audio codec (not shown), a video codec (not shown), a global positioning system ("GPS") device 528, a compass 530, an accelerometer (not shown), a gyroscope (not shown), a speaker 532, a camera 534, and a mass storage device (such as hard disk drive, a solid state drive, compact disk ("CD"), digital versatile disk ("DVD")) (not shown), and so forth. In various embodiments, the processor 504 may be integrated on the same die with other components, such as BMC 507 and/or interrupt handler 515, to form a System on Chip ("SoC").

In various embodiments, volatile mentor (e.g., DRAM 508), non-volatile memory (e.g., ROM 510), flash memory 512, and the mass storage device may include programming instructions configured to enable computing device 500, in response to execution by processor(s) 504, to practice all or selected aspects of method 300 and/or 400. For example, one or more of the memory components such as volatile memory (e.g., DRAM 508), non-volatile memory (e.g., ROM 510), flash memory 512, and the mass storage device may include temporal and/or persistent copies of instructions configured to enable computing device 500 to practice disclosed techniques, such as all or selected aspects of method 300 and/or method 400.

The communication chip 506 may enable wired and/or wireless communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to Wi-Fi (IEEE 802.11 family), WiMAX (IEEE 802.16 family), IEEE 802.20, Long Term evolution ("LTE"), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 500 may include a plurality of communication chips 506. For instance, a first communication chip 506 may be dedicated to shorter range wireless communications such as Wi-Fi and Bluetooth and a second communication chip 506 may be dedicated to longer range wireless communications such as GPS, EDGE, GPRS, CDMA, WiMAX, LTE, Ev-DO, and others.

In various implementations, the computing device 500 may be a laptop, a netbook, a notebook, an ultrabook, a smart phone, a computing tablet, a personal digital assistant ("PDA"), an ultra mobile PC, a mobile phone, a desktop computer, a server, a printer, a scanner, a monitor, a set-top box, an entertainment control unit (e.g., a gaming console), a digital camera, a portable music player, or a digital video recorder. In further implementations, the computing device 500 may be any other electronic device that processes data.

In various embodiments, processor 504 (or one of its processor cores) may be packaged together with one or more platform entities. For one embodiment, processor 504 (or one of its processor cores) may be packaged together with one or more platform entities to form a System in Package (SiP). For one embodiment, processor 504 (or one of its processor cores) may be packaged together with one or more platform entities, and may be integrated on the same die. For one embodiment, processor 504 (or one of its processor cores) may be packaged together with one or more platform entities to form an SoC.

Embodiments of apparatus, computer-implemented methods, systems, devices, and computer-readable media are described herein for enabling a platform entity such of a computing device, such as an interrupt handler, to notify an operating system or virtual machine monitor executing on the computing device of an input/output error-containment event, and responsive to a directive from the operating system or virtual machine monitor, facilitate recovery of a link to an input/output device that caused the input/output error-containment event. In various embodiments, the interrupt handler may further notify the operating system or virtual machine monitor of the input/output error-containment event using a platform communication channel, e.g., using a doorbell protocol.

In various embodiments, the interrupt handler may identify a port associated with the input/output device that caused the input/output error-containment event, and notify the operating system or virtual machine monitor of the identified port. In various embodiments, the interrupt handler may generate an error-containment record associated with the error-containment event. In various embodiments, the interrupt handler may clear an error log associated with the input/output device that caused the input/output error-containment event.

In various embodiments, the interrupt handler may store, in memory accessible to the operating system or virtual machine monitor, information associated with a plurality of input/output ports that is usable by the operating system or virtual machine monitor to register a plurality of error-containment event handlers that correspond to the plurality of input/output ports.

Embodiments of apparatus, computer-implemented methods, systems, devices, and computer-readable media also are described herein for enabling an operating system or a virtual machine monitor of a computing device to receive, from an interrupt handler of the computing device, notification of an error-containment event, and in response to the notification, to facilitate recovery of a link to an input/output device that caused the error-containment event. In various embodiments, the operating system or virtual machine monitor may notify a driver associated with the input/output device that caused the error containment event of the error-containment event.

In various embodiments, the operating system or virtual machine monitor may receive, from the driver associated with the input/output device, a notification that the driver is able to recover the input/output device. In various embodiments, the operating system or virtual machine monitor may register a plurality of error-containment event handlers associated with a plurality of input/output ports, based on information associated with the plurality of input/output ports that is generated by the interrupt handler. In various embodiments, the operating system or virtual machine monitor may receive the notification of the error-containment event from the interrupt handler over a platform communication channel, e.g., using a doorbell protocol. In various embodiments, the operating system or virtual machine monitor may communicate, to the interrupt handler, e.g., over the platform communication channel, a directive to recover the link to the input/output device that caused the input/output error.

Although certain embodiments have been illustrated and described herein for purposes of description, this application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory computer-readable medium having computer-readable code embodied therein, the computer-readable code comprising instructions to cause an interrupt handler of a computing device, in response to execution of the instructions by the computing device, to notify an operating system or virtual machine monitor executing on the computing device of an input/output error-containment event caused by an input/output device, and responsive to a directive, including an indication that the operating system or virtual machine monitor cleared a software stack associated with the input/output device, from the operating system or virtual machine monitor, facilitate recovery of a link to the input/output device.

2. The at least one computer-readable medium of claim 1, wherein the instructions, in response to execution by the computing device, further cause the interrupt handler to notify the operating system or virtual machine monitor of the input/output error-containment event using a platform communication channel.

3. The at least one computer-readable medium of claim 1, wherein the instructions, in response to execution by the computing device, further cause the interrupt handler to identify a port associated with the input/output device that caused the input/output error-containment event, and to notify the operating system or virtual machine monitor of the identified port.

4. The at least one computer-readable medium of claim 1, wherein the instructions, in response to execution by the computing device, further cause the interrupt handler to generate an error-containment record associated with the input/output error-containment event.

5. The at least one computer-readable medium of claim 1, wherein the instructions, in response to execution by the computing device, further cause the interrupt handler to clear an error log associated with the input/output device that caused the input/output error-containment event.

6. The at least one computer-readable medium of claim 1, wherein the instructions, in response to execution by the computing device, further cause the interrupt handler to store, in memory accessible to the operating system or virtual machine monitor, information associated with a plurality of input/output ports that is usable by the operating system or virtual machine monitor to register a plurality of error-containment event handlers that correspond to the plurality of input/output ports.

7. The at least one non-transitory computer-readable medium of claim 1, wherein to facilitate recovery of a link comprises altering, by the interrupt handler, contents of various hardware registers associated with the input/output device to recover the link.

8. At least one non-transitory computer-readable medium having computer-readable code embodied therein, the computer-readable code comprising instructions to cause an operating system or virtual machine monitor of a computing device, in response to execution of the instructions by the computing device, to:
  receive, from an interrupt handler of the computing device, notification of an error-containment event caused by an input/output device;
  receive, from a driver associated with the input/output device, an indication that the driver is able to recover a link to the input/output device in response to an error-containment event handler registered by the operating system or virtual machine monitor notifying the driver of the error-containment event; and
  facilitate recovery of the link to an input/output device that caused the error-containment event based on the indication that the driver is able to recover the input/output device.

9. The at least one computer-readable medium of claim 8, wherein the instructions, in response to execution by the computing device, further cause the operating system or virtual machine monitor to register a plurality of error-containment event handlers associated with a plurality of input/output ports, based on information associated with a plurality of input/output ports that is generated by the interrupt handler.

10. The at least one computer-readable medium of claim 8, wherein the instructions, in response to execution by the computing device, further cause the operating system or virtual machine monitor to receive the notification of the error-containment event from the interrupt handler over a platform communication channel doorbell protocol.

11. The at least one computer-readable medium of claim 8, wherein the instructions, in response to execution by the computing device, further cause the operating system or virtual machine monitor to communicate, to the interrupt handler, a directive to recover the link to the input/output device.

12. The at least one non-transitory computer-readable medium of claim 8, wherein the notification of the error-containment event includes an identification of an input/output port associated with the input/output device, and wherein the error-containment event handler is selected from a plurality of error-containment event handlers registered by the operating system or the virtual machine monitor based on the identification of the input/output port.

13. A computer-implemented method, comprising:
  identifying, by an interrupt handler of a computing system, an input/output port that signaled an input/output error-containment event;
  generating, by the interrupt handler, an error-containment record associated with the input/output error-containment event, the error-containment record including an identification of the input/output port;
  providing, by the interrupt handler to an operating system or virtual machine monitor executing on the computing device, the error-containment record; and
  receiving, by the interrupt handler from the operating system or virtual machine monitor, a directive indicating the input/output port can recover from the input/output error-containment event, the indication based on a determination issued by a driver associated with the input/output port in response to an error-containment event handler registered by the operating system or virtual machine monitor notifying the driver of the input/output error-containment event.

14. The computer-implemented method of claim 13, further comprising, responsive to the directive from the operating system or virtual machine monitor, facilitating, by the interrupt handler, recovery of a link from the input/output port to an input/output device that caused the input/output error-containment event.

15. The computer-implemented method of claim 13, further comprising notifying, by the interrupt handler, the operating system or virtual machine monitor of the input/output error-containment event using a platform communication channel.

16. The computer-implemented method of claim 13, further comprising clearing, by the interrupt handler, an error log associated with the input/output port.

17. The computer-implemented method of claim 13, further comprising storing, by the interrupt handler, in memory accessible to the operating system or virtual machine monitor, information associated with a plurality of input/output ports that is usable by the operating system or virtual machine monitor to register a plurality of error-containment event handlers that correspond to the plurality of input/output ports.

18. A computer-implemented method, comprising:
receiving, by an operating system or virtual machine monitor executing on a computing device, from a platform entity of the computing device, notification of an error-containment event caused by an input/output device;
clearing, by the operating system or virtual machine monitor, a software stack associated with the input/output device in response to receiving the notification of the error-containment event; and
instructing, by the operating system or virtual machine monitor, the platform entity to recover a link to an input/output device in response to completing the clearing of the software stack.

19. The computer-implemented method of claim 18, further comprising notifying, by the operating system or virtual machine monitor, a driver associated with the input/output device of the error-containment event.

20. The computer-implemented method of claim 18, further comprising registering, by the operating system or virtual machine monitor, a plurality of error-containment event handlers associated with a plurality of input/output ports, based on information associated with the plurality of input/output ports that is generated by the platform entity.

21. The computer-implemented method of claim 18, further comprising receiving, by the operating system or virtual machine monitor, the notification of the error-containment event from the platform entity over a platform communication channel.

22. The computer-implemented method of claim 18, further comprising communicating, by the operating system or virtual machine monitor, to the platform entity, a directive to recover the link to the input/output device.

23. A system, comprising:
one or more processors;
an interrupt handler; and
an operating system or virtual machine monitor;
wherein the interrupt handler is to, responsive to an input/output error-containment event, identify a root port that signaled the input/output error-containment event, generate an error-containment record associated with the input/output error-containment event, the error-containment record including an identification of the root port, and provide, to the operating system or virtual machine monitor, the error-containment record; and
wherein the operating system or virtual machine monitor is to receive, from the interrupt handler, the error-containment record, to clear a software stack associated with the root port, and to facilitate recovery of a link to an input/output device associated with the root port.

24. The system of claim 23, wherein the interrupt handler is further to store, in memory accessible to the operating system or virtual machine monitor, information associated with a plurality of input/output ports that is usable by the operating system or virtual machine monitor to register a plurality of error-containment event handlers that correspond to the plurality of input/output ports.

25. The system of claim 23, further comprising a platform communication channel over which the interrupt handler and operating system or virtual machine monitor communicate.

26. The system of claim 23, further comprising Live Error Recovery logic to trigger the input/output error-containment event.

27. The system of claim 23, further comprising a touch screen display coupled to the root port, wherein facilitating recovery of a link comprises facilitating recovery of a link to the touch screen display.

* * * * *